United States Patent
Bodie et al.

(10) Patent No.: US 7,510,061 B2
(45) Date of Patent: Mar. 31, 2009

(54) MR-FLUID HYDRAULIC MOUNT

(75) Inventors: Mark O. Bodie, Dayton, OH (US);
Mark W. Long, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 22 days.

(21) Appl. No.: 11/319,109

(22) Filed: Dec. 27, 2005

(65) Prior Publication Data
US 2007/0144843 A1    Jun. 28, 2007

(51) Int. Cl.
*F16F 9/53* (2006.01)
(52) U.S. Cl. .............................. 188/267.2; 267/140.11
(58) Field of Classification Search ................. 188/267, 188/267.2; 267/140.11, 140.13, 140.14, 267/140.15
See application file for complete search history.

(56) References Cited

U.S. PATENT DOCUMENTS

| | | | |
|---|---|---|---|
| 4,679,779 A | 7/1987 | Hodonsky | |
| 4,973,031 A | 11/1990 | Takano et al. | |
| 4,997,168 A | 3/1991 | Kato | |
| 5,246,211 A | 9/1993 | Klein et al. | |
| 5,273,262 A | 12/1993 | Baldini et al. | |
| 5,284,330 A | 2/1994 | Carlson et al. | |
| 5,398,917 A * | 3/1995 | Carlson et al. | 267/140.14 |
| 5,730,429 A | 3/1998 | Ivers et al. | |
| 5,878,851 A * | 3/1999 | Carlson et al. | 188/269 |
| 5,882,226 A * | 3/1999 | Bell et al. | 439/582 |
| 6,412,761 B1 | 7/2002 | Baudendistel et al. | |
| 6,622,995 B2 | 9/2003 | Baudendistel et al. | |
| 6,749,045 B2 | 6/2004 | Rosenfeldt et al. | |
| 2002/0153647 A1 | 10/2002 | Baudendistel et al. | |
| 2002/0171186 A1 | 11/2002 | Baudendistel et al. | |
| 2003/0025255 A1 | 2/2003 | Gade et al. | |
| 2004/0233025 A1* | 11/2004 | Kon et al. | 335/220 |
| 2005/0173211 A1 | 8/2005 | Hopkins et al. | |
| 2005/0230890 A1 | 10/2005 | Tewani et al. | |
| 2005/0242321 A1 | 11/2005 | Iyengar et al. | |

FOREIGN PATENT DOCUMENTS

| | | |
|---|---|---|
| EP | 1 288 526 | 7/2002 |
| JP | [H]03-229032 | 10/1991 |
| WO | WO 01/51826 | 7/2001 |

\* cited by examiner

*Primary Examiner*—Xuan Lan Nguyen
(74) *Attorney, Agent, or Firm*—Thomas N. Twane

(57) ABSTRACT

An MR-fluid (magnetorheological-fluid) hydraulic mount includes a hydraulic-mount partition plate assembly and an electric coil. The partition plate assembly has a longitudinal axis, has first and second sides, and has an MR-fluid through orifice extending substantially parallel to the longitudinal axis from the first side to the second side. The partition plate assembly is devoid of any non-MR-hydraulic-fluid orifice. The electric coil is substantially coaxially aligned with the longitudinal axis and is adapted to magnetically influence the MR-fluid through orifice. The MR-fluid through orifice is positioned radially outward of the electric coil.

2 Claims, 2 Drawing Sheets

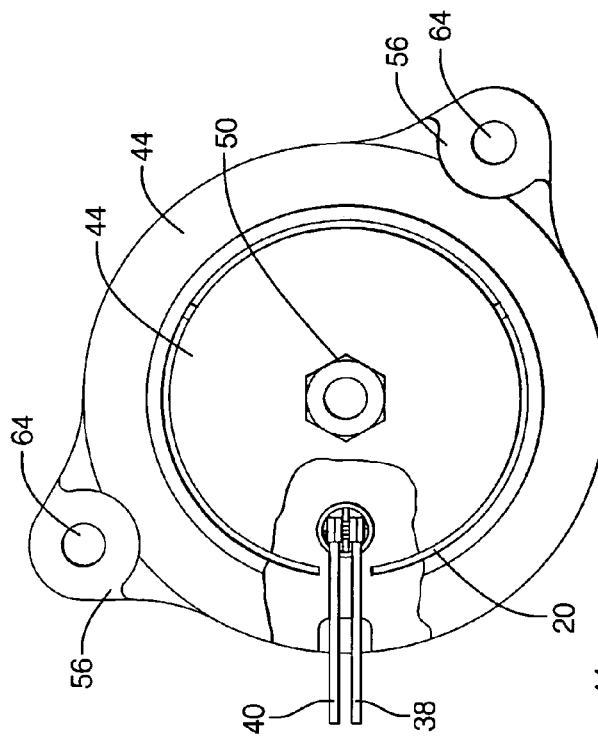
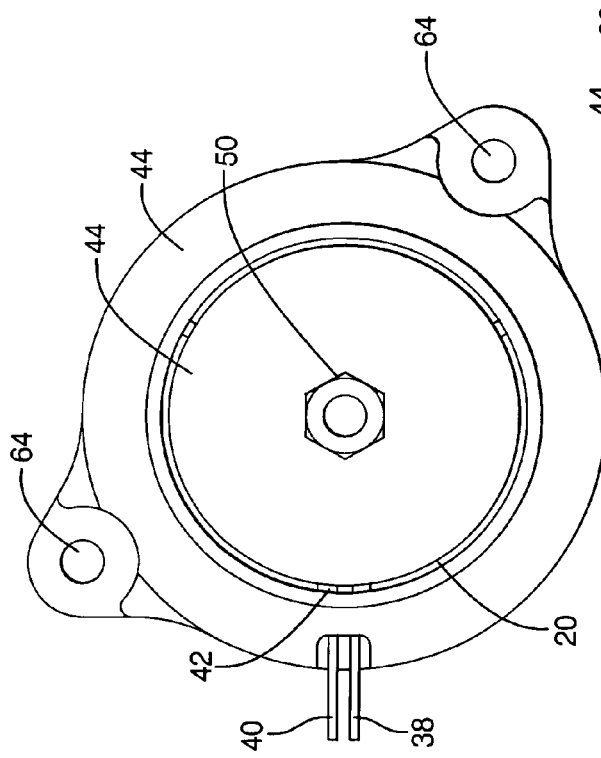
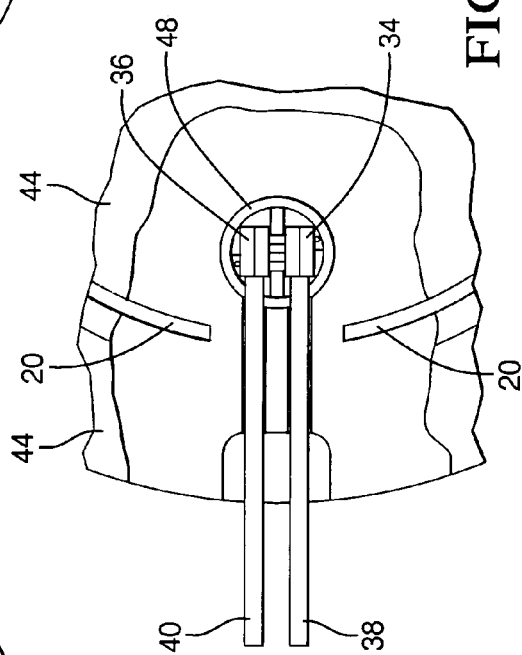

MR-FLUID HYDRAULIC MOUNT

TECHNICAL FIELD

The present invention relates generally to hydraulic mounts, and more particularly to an MR-fluid (magnetorheological-fluid) hydraulic mount.

BACKGROUND OF THE INVENTION

Conventional magnetorheological-fluid (MR-fluid) hydraulic mounts include those which are attachable to first and second motor-vehicle components (such as an automobile engine or transmission and an automobile frame) and which have a pumping chamber and a reservoir chamber. The pumping and reservoir chambers are separated by a partition plate having a first through hole containing a decoupler and having a second through hole not containing a decoupler. These mounts also have an electric coil which magnetically influences the second through hole but not the first through hole. Magnetorheological fluid is placed in the pumping and reservoir chambers and in the first and second through holes. The decoupler flexes for relative vibratory motion between the two motor-vehicle components which is of relatively low displacement and higher frequency. The decoupler bottoms out (i.e., reaches its fully flexed limit and flexes no further) for relative motion between the two motor-vehicle components which is of relatively high displacement and lower frequency. Examples of hydraulic-mount decouplers are found in U.S. Pat. Nos. 5,273,262 and 6,622,995.

What is needed is an improved MR-fluid hydraulic mount.

SUMMARY OF THE INVENTION

In a first expression of an embodiment of the invention, an MR-fluid (magnetorheological-fluid) hydraulic mount includes a hydraulic-mount partition plate assembly and an electric coil. The partition plate assembly has a longitudinal axis, has first and second sides, and has an MR-fluid through orifice extending substantially parallel to the longitudinal axis from the first side to the second side. The partition plate assembly is devoid of any non-MR-hydraulic-fluid orifice. The electric coil is substantially coaxially aligned with the longitudinal axis and is adapted to magnetically influence the MR-fluid through orifice. The MR-fluid through orifice is positioned radially outward of the electric coil.

In a second expression of an embodiment of the invention, an MR-fluid (magnetorheological-fluid) hydraulic mount includes a hydraulic-mount partition plate assembly, an electric coil, and MR (magnetorheological-fluid) fluid. The partition plate assembly has a longitudinal axis, has first and second sides, and has an MR-fluid through orifice extending substantially parallel to the longitudinal axis from the first side to the second side. The partition plate assembly is devoid of any non-MR-hydraulic-fluid orifice. The electric coil is substantially coaxially aligned with the longitudinal axis and is adapted to magnetically influence the MR-fluid through orifice. The MR-fluid through orifice is positioned radially outward of the electric coil. The MR fluid is located in the MR-fluid through orifice and is located in contact with the first and second sides. The MR-fluid hydraulic mount is devoid of any non-MR hydraulic fluid.

Several benefits and advantages are derived from one or more of the expressions of an embodiment of the invention. In one example, the MR-fluid through orifice is a substantially annular orifice located at a substantially radially outermost location of the MR-fluid hydraulic mount which provides a larger orifice gap area for a given orifice gap distance, such larger orifice gap area allowing higher frequency off-current performance of the mount before the orifice gap becomes "choked off" and reduces the isolation of the mount, as can be appreciated by those skilled in the art.

SUMMARY OF THE DRAWINGS

FIG. 2 is a top planar view of the partition plate assembly and first and second coil leads of FIG. 1;

FIG. 3 is a view, as in FIG. 2, but with a portion broken away exposing the first and second terminal posts; and FIG. 4 is an enlarged view of the broken away portion of FIG. 3.

DESCRIPTION OF THE PREFERRED EMBODIMENT

Figure 1:
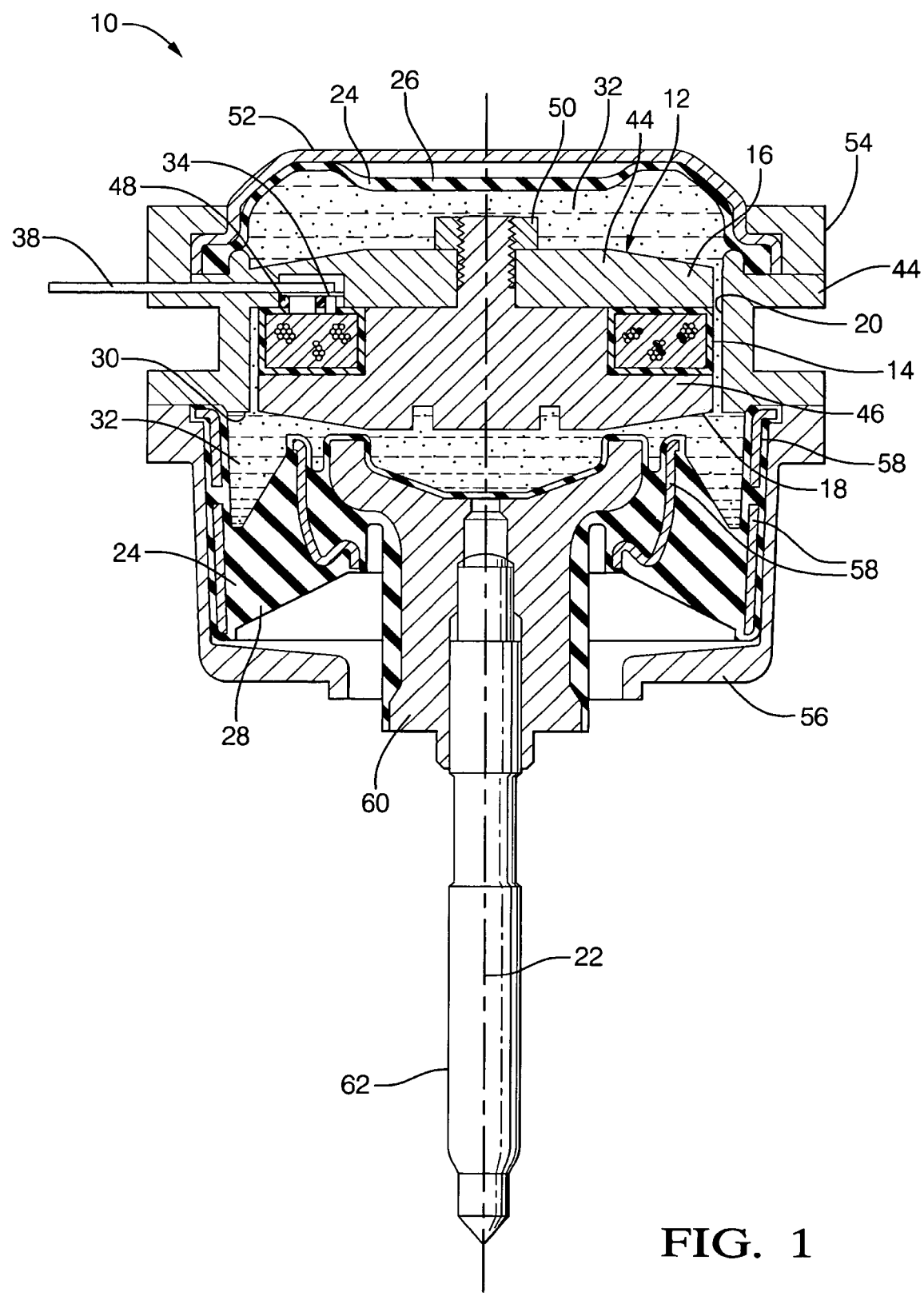
FIG. 1 is a longitudinal cross-sectional schematic view of an embodiment of an MR-fluid (magnetorheological-fluid) hydraulic mount of the invention.

Referring now to the drawing, FIGS. 1-4 show an embodiment of the present invention. A first expression of the embodiment of FIGS. 1-4 is for an MR-fluid (magnetorheological-fluid) hydraulic mount 10 including a hydraulic-mount partition plate assembly 12 and an electric coil 14. The partition plate assembly 12 has a longitudinal axis 22, has first and second sides 16 and 18, and has an MR-fluid through orifice 20 extending substantially parallel to the longitudinal axis 22 from the first side 16 to the second side 18. The partition plate assembly 12 is devoid of any non-MR-hydraulic-fluid orifice (whether a through orifice or a non-through orifice). The electric coil 14 is substantially coaxially aligned with the longitudinal axis 22 and is adapted to magnetically influence the MR-fluid through orifice 20. The MR-fluid through orifice 20 is disposed radially outward of the electric coil 14.

In one enablement of the first expression of the embodiment of FIGS. 1-4, the MR-fluid hydraulic mount 10, also includes a flexible, MR-fluid-sealing assembly 24. The MR-fluid-sealing assembly 24 has a first portion 26 and a second portion 28. The first portion 26 is hermetically sealed to the first side 16 and surrounds the MR-fluid through orifice 20. The second portion 28 is hermetically sealed to the second side 18 and surrounds the MR-fluid through orifice 20.

In one implementation of the first expression of the embodiment of FIGS. 1-4, the MR-fluid through orifice 20 is a substantially annular orifice substantially coaxially aligned with the longitudinal axis 22, the second side 18 has a radially-outermost extent 30 adapted for contact with MR fluid 32, and the MR-fluid through orifice 20 is disposed proximate the radially-outermost extent 30. In one variation, the second side 18 from the longitudinal axis 22 to the radially-outermost extent 30 is adapted for contact with the MR fluid 32. In one modification, the partition-plate assembly 12 is devoid of any other MR-fluid through orifice. In one example, the partition plate assembly 12 is devoid of any hydraulic-mount decoupler operatively connected to any MR-fluid through orifice.

In one application of the first expression of the embodiment of FIGS. 1-4, the partition plate assembly 12 includes first and second terminal posts 34 and 36 in operative electrical connection with the electric coil 14. In one variation, the MR-fluid hydraulic mount 10 also includes first and second coil leads 38 and 40 electrically connected, respectively, to the first and second terminal posts 34 and 36. In one modification, the MR-fluid through orifice 20 is a substantially annular orifice substantially coaxially aligned with the longitudinal axis 22, the partition plate assembly 12 includes a spoke 42 which crosses the substantially annular orifice, and the spoke 42 surrounds the first and second coil leads 38 and 40. In one example, the partition plate assembly 12 includes an upper plate 44 and includes a lower plate 46 in contact with the upper plate 44. In this example, the electric coil 14 is disposed in the lower plate 46, the lower plate 46 includes the first and second terminal posts 34 and 36, and the upper plate 44 includes the spoke 42. In this example, the MR-fluid hydraulic mount 10 also includes an O-ring seal 48 disposed between the upper and lower plates 44 and 46 and surrounding the first and second terminal posts 34 and 36.

In one construction of the first expression of the embodiment of FIGS. 1-4, the electric coil 14 is a plastic-encapsulated electric coil, and a nut 50 secures the upper plate 44 to the lower plate 46 as shown in FIG. 1. In one variation, the MR-fluid hydraulic mount includes a metal base plate 52 surrounding the (e.g., rubber) first portion 26 of the MR-fluid-sealing assembly 24, and a metal ring 54 secures the base plate 52 to the upper plate 44. In one modification, a metal housing 56 is attached to the upper plate 44 and surrounds the (e.g., rubber) second portion 28 of the MR-fluid-sealing assembly 24. In one example, metal inserts 58 in the second portion 28 are used to adjust the rate of the MR-fluid hydraulic mount 10. In one illustration, the second portion 28 surrounds a metal second-portion supporting member 60 secured to a metal mounting stud 62. In one configuration, the housing 56 includes mounting holes 64. In one arrangement, the housing 56 is attached to a motor-vehicle frame (not shown) and the mounting stud 62 is attached to a motor-vehicle engine (not shown) which hangs from the MR-fluid hydraulic mount 10. Other constructions are left to those skilled in the art.

A second expression of the embodiment of FIGS. 1-4 is for an MR-fluid (magnetorheological-fluid) hydraulic mount 10 including a hydraulic-mount partition plate assembly 12, an electric coil 14, and MR (magnetorheological) fluid 32. The partition plate assembly 12 has a longitudinal axis 22, has first and second sides 16 and 18, and has an MR-fluid through orifice 20 extending substantially parallel to the longitudinal axis 22 from the first side 16 to the second side 18. The partition plate assembly 12 is devoid of any non-MR-hydraulic-fluid orifice (whether a through orifice or a non-through orifice). The electric coil 14 is substantially coaxially aligned with the longitudinal axis 22 and is adapted to magnetically influence the MR-fluid through orifice 20. The MR-fluid through orifice 20 is disposed radially outward of the electric coil 14. The MR fluid 32 is disposed in the MR-fluid through orifice 20 and is disposed in contact with the first and second sides 16 and 18. The MR-fluid hydraulic mount 10 is devoid of any non-MR hydraulic fluid.

In one enablement of the second expression of the embodiment of FIGS. 1-4, the MR-fluid hydraulic mount 10, also includes a flexible, MR-fluid-sealing assembly 24. The MR-fluid-sealing assembly 24 has a first portion 26 and a second portion 28. The first portion 26 is hermetically sealed to the first side 16 and surrounds the MR-fluid through orifice 20. The second portion 28 is hermetically sealed to the second side 18 and surrounds the MR-fluid through orifice 20. The MR fluid 32 is disposed in contact with the first and second portions 26 and 28.

In one implementation of the second expression of the embodiment of FIGS. 1-4, the MR-fluid through orifice 20 is a substantially annular orifice substantially coaxially aligned with the longitudinal axis 22, the second side 18 has a radially-outermost extent 30 in contact with the MR fluid 32, and the MR-fluid through orifice 20 is disposed proximate the radially-outermost extent 30. In one variation, the second side 18 from the longitudinal axis 22 to the radially-outermost extent 30 is in contact with the MR fluid 32. In one modification, the partition-plate assembly 12 is devoid of any other MR-fluid through orifice. In one example, the partition plate assembly 12 is devoid of any hydraulic-mount decoupler operatively connected to any MR-fluid through orifice.

In one application of the second expression of the embodiment of FIGS. 1-4, the partition plate assembly 12 includes first and second terminal posts 34 and 36 in operative electrical connection with the electric coil 14. In one variation, the MR-fluid hydraulic mount 10 also includes first and second coil leads 38 and 40 electrically connected, respectively, to the first and second terminal posts 34 and 36. In one modification, the MR-fluid through orifice 20 is a substantially annular orifice substantially coaxially aligned with the longitudinal axis 22, the partition plate assembly 12 includes a spoke 42 which crosses the substantially annular orifice, and the spoke 42 surrounds the first and second coil leads 38 and 40. In one example, the partition plate assembly 12 includes an upper plate 44 and includes a lower plate 46 in contact with the upper plate 44. In this example, the electric coil 14 is disposed in the lower plate 46, the lower plate 46 includes the first and second terminal posts 34 and 36, and the upper plate 44 includes the spoke 42. In this example, the MR-fluid hydraulic mount 10 also includes an O-ring seal 48 disposed between the upper and lower plates 44 and 46 and surrounding the first and second terminal posts 34 and 36.

Several benefits and advantages are derived from one or more of the expressions of an embodiment of the invention. In one example, the MR-fluid through orifice is a substantially annular orifice located at a substantially radially outermost location of the MR-fluid hydraulic mount which provides a larger orifice gap area for a given orifice gap distance, such larger orifice gap area allowing higher frequency off-current performance of the mount before the orifice gap becomes "choked off" and reduces the isolation of the mount, as can be appreciated by those skilled in the art.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

The invention claimed is:

1. An MR-fluid hydraulic mount comprising:
a) a hydraulic-mount partition plate assembly having a longitudinal axis, having first and second sides with substantially opposing and longitudinally-outwardly-facing surfaces, and having an MR-fluid through orifice extending substantially parallel to the longitudinal axis from the surface of the first side to the surface of the second side, wherein the partition plate assembly is devoid of any non-MR-hydraulic-fluid orifice and wherein the surfaces of the first and second sides are in fluid communication with the MR-fluid through orifice; and
b) an electric coil substantially coaxially aligned with the longitudinal axis and adapted to magnetically influence the MR-fluid through orifice, wherein the MR-fluid through orifice is disposed radially outward of the electric coil, wherein the partition plate assembly includes first and second terminal posts in operative electrical connection with the electric coil, also including first and second coil leads electrically connected, respectively, to the first and second terminal posts, wherein the MR-fluid through orifice is a substantially annular orifice substantially coaxially aligned with the longitudinal axis, wherein the partition plate assembly includes a spoke which crosses the substantially annular orifice, wherein the spoke surrounds the first and second coil leads, wherein the partition plate assembly includes an upper plate and includes a lower plate in contact with the upper plate, wherein the electric coil is disposed in the lower plate, wherein the lower plate includes the first and second terminal posts, wherein the upper plate includes the spoke, and also including an O-ring seal disposed between the upper and lower plates and surrounding the first and second terminal posts.

2. An MR-fluid hydraulic mount comprising:
a) a hydraulic-mount partition plate assembly having a longitudinal axis, having first and second sides with substantially opposing and longitudinally-outwardly-facing surfaces, and having an MR-fluid through orifice extending substantially parallel to the longitudinal axis from the surface of the first side to the surface of the second side, wherein the partition plate assembly is devoid of any non-MR-hydraulic-fluid orifice and wherein the surfaces of the first and second sides are in fluid communication with the MR-fluid through orifice;
b) an electric coil substantially coaxially aligned with the longitudinal axis and adapted to magnetically influence the MR-fluid through orifice, wherein the MR-fluid through orifice is disposed radially outward of the electric coil; and
c) MR fluid disposed in the MR-fluid through orifice and disposed in contact with the surfaces of the first and second sides, wherein the MR-fluid hydraulic mount is devoid of any non-MR hydraulic fluid, wherein the partition plate assembly includes first and second terminal posts in operative electrical connection with the electric coil, also including first and second coil leads electrically connected, respectively, to the first and second terminal posts, wherein the MR-fluid through orifice is a substantially annular orifice substantially coaxially aligned with the longitudinal axis, wherein the partition plate assembly includes a spoke which crosses the substantially annular orifice, wherein the spoke surrounds the first and second coil leads, wherein the partition plate assembly includes an upper plate and includes a lower plate in contact with the upper plate, wherein the electric coil is disposed in the lower plate, wherein the lower plate includes the first and second terminal posts, wherein the upper plate includes the spoke, and also including an O-ring seal disposed between the upper and lower plates and surrounding the first and second terminal posts.

* * * * *